United States Patent
Bruzy et al.

(10) Patent No.: US 6,771,178 B2
(45) Date of Patent: Aug. 3, 2004

(54) METHOD OF IDENTIFYING ACTUATORS IN A MOTOR-VEHICLE AIR-CONDITIONING INSTALLATION

(75) Inventors: Christophe Bruzy, Beynes (FR); Philippe Richardot, Vesoul (FR)

(73) Assignee: Valeo Climatisation, La Verriere (FR)

( * ) Notice: Subject to any disclaimer, the term of this patent is extended or adjusted under 35 U.S.C. 154(b) by 264 days.

(21) Appl. No.: 10/045,069

(22) Filed: Jan. 15, 2002

(65) Prior Publication Data

US 2002/0096573 A1 Jul. 25, 2002

(30) Foreign Application Priority Data

Jan. 24, 2001 (FR) .............................................. 01 00915

(51) Int. Cl.⁷ .............................................. G08B 21/00
(52) U.S. Cl. ...................... 340/648; 340/653; 340/657; 340/659; 318/565; 318/567; 251/25
(58) Field of Search ................................ 340/648, 635, 340/653, 657, 659; 318/567, 565; 251/25

(56) References Cited

U.S. PATENT DOCUMENTS 5,791,981 A    8/1998   Drobner

FOREIGN PATENT DOCUMENTS

DE      198 28 259 A    12/1999
EP      0 838 357 A     4/1988

*Primary Examiner*—Julie Lieu
(74) *Attorney, Agent, or Firm*—Ronald Courtney

(57) ABSTRACT

A flap to be identified is caused to move over the whole of its angular range of travel. The number of motor steps is counted during this movement, and the number of steps counted is compared with at least one pre-recorded information item corresponding to a particular flap or type of flap. The method is applicable to the checking of the correct fitting of actuator housings in an air-conditioning installation, or to the allocation of addresses to actuators connected to an information bus.

5 Claims, 4 Drawing Sheets

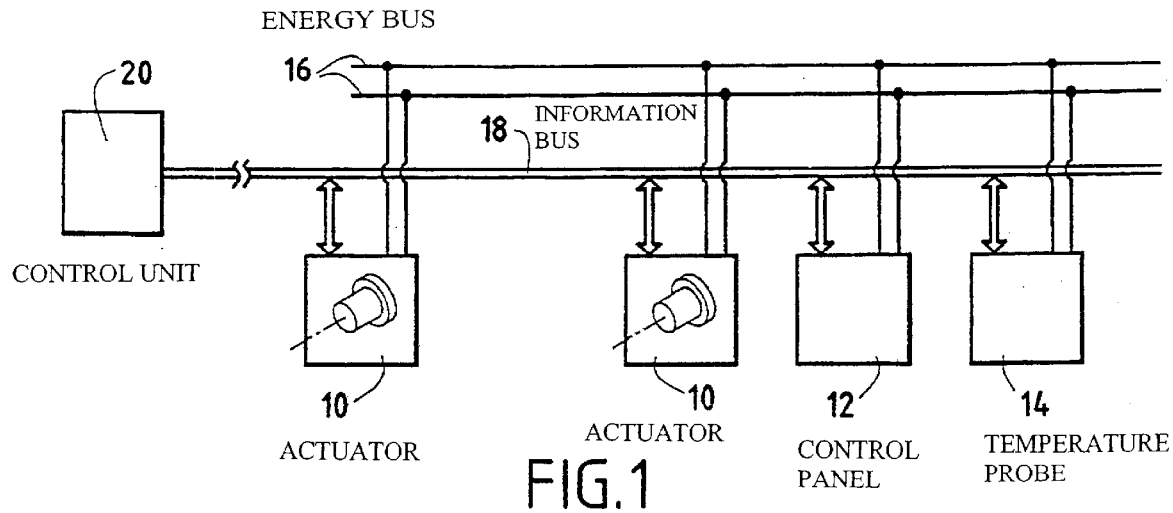
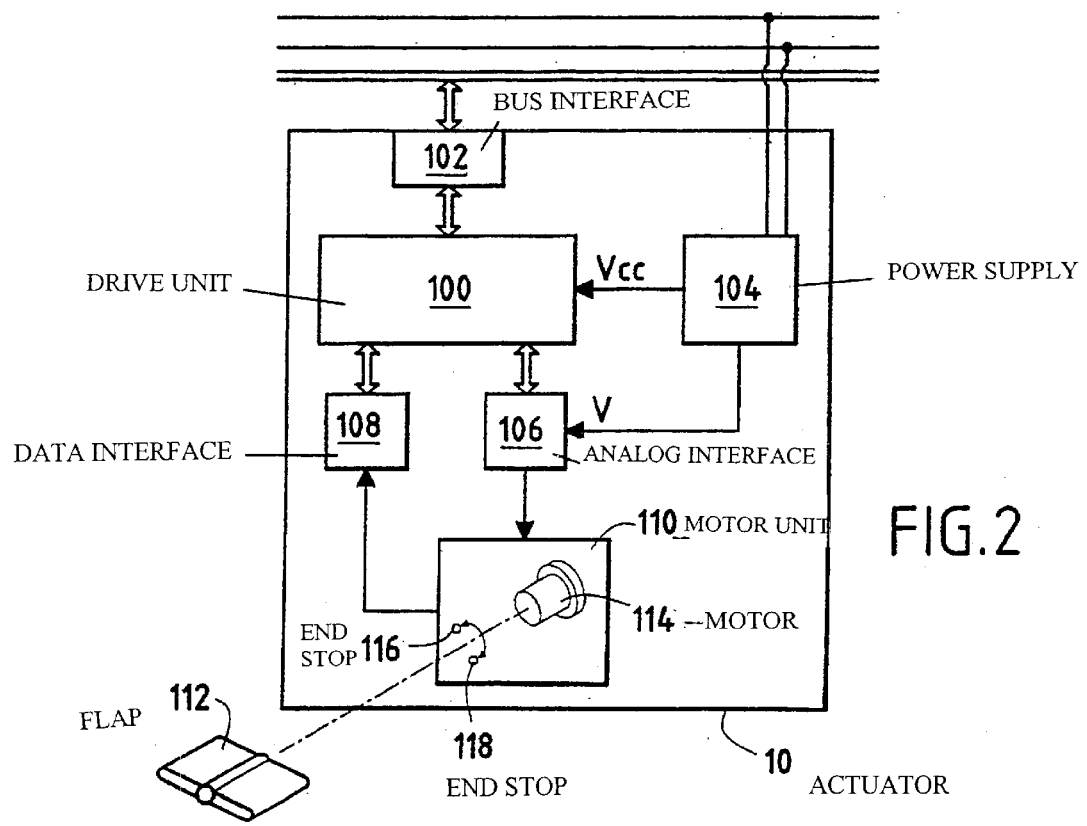

METHOD OF IDENTIFYING ACTUATORS IN A MOTOR-VEHICLE AIR-CONDITIONING INSTALLATION

FIELD OF THE INVENTION

The invention relates to motor-vehicle air-conditioning installations, and more particularly to a method of identifying actuators forming part of these installations.

BACKGROUND OF THE INVENTION

Motor-vehicle air-conditioning installations comprise a plurality of mixing flaps or air-distribution flaps which are moved by means of actuators typically using stepper motors.

A central control unit addresses commands to the various actuators so as to bring the flaps into positions corresponding to orders received: ventilation, setting of the temperature in the passenger compartment or different areas of the passenger compartment to a desired value, demisting, de-icing, etc. The control unit also receives information transmitted by the actuators, especially information relating to the positions of the flaps, in particular the arrival at the end of opening or closing travel.

The increasing sophistication of air-conditioning installations is conveyed by an increased number of flaps and therefore of actuators. In order to avoid the use of bulky and expensive wiring harnesses, which are awkward to install, it is known to connect the actuators and other peripherals of the air-conditioning installation, such as control panels and temperature probes, to an information bus linked to the control unit and on which travels control information intended for the peripherals and status information transmitted by them to the control unit.

It is then necessary to allocate an individual address to each peripheral, especially to each actuator.

For the sake of standardisation, with a view to reducing costs, actuators of the same type are used for the various flaps. They therefore take the form of similar housings.

When the addresses of the actuators are recorded in them before they are fitted, risks of errors in fitting may arise by reason of the similarities between the housings. It is then desirable to have available an easy and rapid means of verifying the correct fitting, and therefore of identifying the actuators fitted.

The allocation of the addresses may, in a variant, be carried out after fitting of the housings, offering the advantage of standardisation thereof. Here again, this requires a means of identifying the actuators, identification means which should preferably be rapid and automatic.

The same concern for verifying the fitting or the address allocation arises in the event of repair, when one or more actuators have to be replaced.

SUMMARY OF THE INVENTION

The object of the invention is to offer a method of identifying an actuator using a stepper motor which makes it possible easily, rapidly and automatically to carry out operations of verification or of address allocation during fitting or repair of an air-conditioning installation.

This object is achieved by virtue of a method comprising the stages which consist in:
  causing the flap to move over the whole of its angular range of travel,
  counting the number of motor steps during this movement, and
  comparing the number of steps counted with at least one item of pre-recorded information corresponding to a particular flap or type of flap.

Thus, the method according to the invention is based on a differentiation between actuators on the basis of the angular ranges of travel of the flaps which they drive. This is because, in an air-conditioning installation, depending on the function which they carry out, the mixing or air-distribution flaps generally have different angular ranges of travel defined by end-of-travel stops.

It would be possible to cause the flap to move several times over the whole of its angular range of travel and then to form an average of the numbers of steps counted during the different movements.

The method according to the invention could be used for checking the fitting of an actuator, during manufacture or repair of the air-conditioning installation. In such a case, the flap associated with this actuator is caused to move, and the conformity between the number of steps counted and the pre-recorded information corresponding to this flap is verified.

Such a check remains useful even in the case in which two different flaps have the same angular range of travel. This can occur, for example, in the case of two flaps having identical functions and situated on the right-hand side and on the left-hand side of the vehicle. The risk of an undetected error on fitting is in effect limited only to a possible inversion between the actuators of the two flaps, this risk even being non-existent if, in the course of a repair, a single actuator of these two flaps has to be replaced.

The method according to the invention could also be used for allocating an address to an actuator, during manufacture or repair of the air-conditioning installation. In such a case, the flap associated with this actuator is caused to move, this flap is identified by comparison between the number of steps counted and several pre-recorded information items corresponding to different flaps, and an address corresponding to the flap identified is stored in a memory of a circuit associated with the actuator.

Upon initial fitting of the actuators in the air-conditioning installation, this address-allocation method is preferably used in the case where the angular ranges of travel of the flaps can be sufficiently differentiated.

Even in the event that two flaps have the same angular range of travel, the address-allocation method nevertheless remains usable in the event of repair, as long as two flap actuators having the same range of travel do not have to be replaced simultaneously.

BRIEF DESCRIPTION OF THE DRAWINGS

The invention will be better understood on reading the description given below by way of indication but not limitation, by reference to the attached drawings in which:

FIG. 1 is a very diagrammatic view of a motor-vehicle air-conditioning installation;

FIG. 2 is a general diagram of an actuator of the installation of FIG. 1;

DESCRIPTION OF THE PREFERRED EMBODIMENTS

Figure 3:
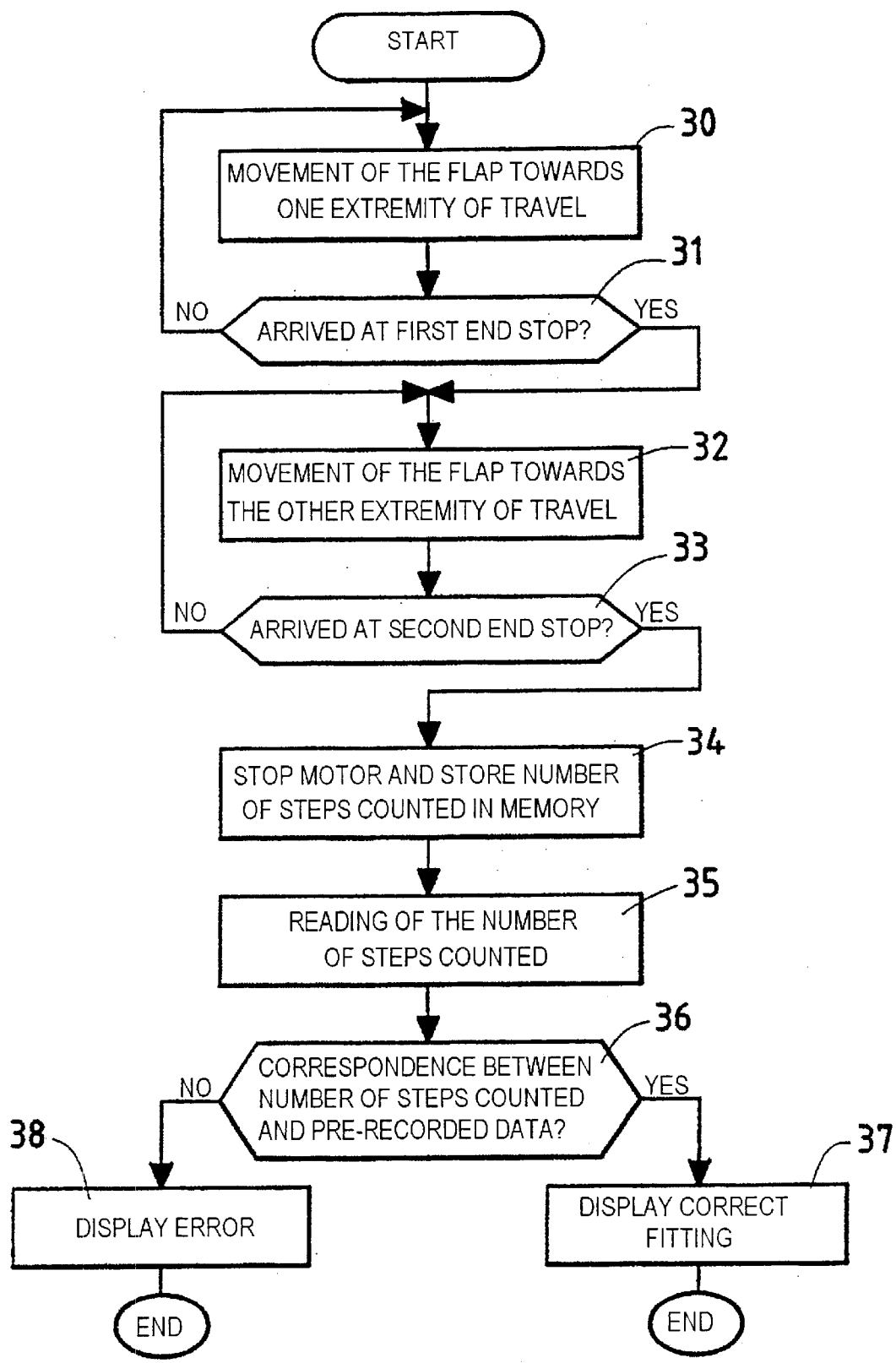
FIG. 3 is a flow chart showing the sequence of an identification method in accordance with the invention applied to the checking of the fitting of a flap actuator.

As FIG. 1 shows very diagrammatically, a motor-vehicle air-conditioning installation conventionally comprises a plurality of actuators 10 (only two of which are shown in the figure) for controlling the movement of air-mixing and distribution flaps so as to carry out desired functions of ventilation, passenger-compartment temperature adjustment, demisting, deicing, etc, controlled from a control panel 12.

The actuators 10, as well as the control panel 12 and temperature probes 14, are linked to an energy bus 16 conveying the voltage of the vehicle battery or a voltage derived from it, and to an information bus 18. The information bus 18 is linked to a central control unit 20. The latter receives status information originating from the control panel 12, from the probes 14 and from the actuators 10, such as flap-position information, and transmits control information, especially commands for actuating the flaps by addressing of the actuators 10, each of them having a specific address.

As FIG. 2 shows in more detail, each actuator 10 comprises a microprocessor-based drive circuit 100 linked to the information bus 18 via a bus interface 102. An electrical power-supply circuit 104 linked to the energy bus 16 comprises filtering, protection and voltage-regulation circuits for delivering a supply logic voltage $V_{cc}$ to the drive circuit 100 and a motor power-supply voltage V to an analog interface circuit 106.

A geared-down motor unit 110 coupled to an air-mixing or distribution flap 112 comprises a stepper motor 114 which receives, from the interface 106, the voltage V in the form of pulse trains applied to the phases of the motor 114 at a given drive frequency, under the control of the unit 100 to which the interface 106 is linked.

A data interface 108 is linked to the geared-down motor unit 110 and to the drive unit 100 in order to transmit status data to it, especially position data from the flap. The angular range of travel of the flap 112 is limited by end-of-travel stops 116, 118 which define the extreme angular positions of the flap, for example flap completely open or flap completely closed. The arrival of the flap at the end of travel is detected by the drive unit 100 via the interface 108. The end stops 116, 118 interact with the shaft of the flap 112 or of the motor 114 or of a rotary member coupled to them.

An air-conditioning installation and an actuator as briefly described above are known to the person skilled in the art, so that a more detailed description is not necessary.

In accordance with the invention, an actuator can be identified by the measurement of the angular range of travel of the flap which is associated with it, more precisely by counting down the number of motor steps, that is to say of individual steps of the stepper motor, which are accomplished during the movement of the flap over the whole of its angular range of travel.

To that end, the central control unit drives an actuator to be identified so as to cause the associated flap to move over its entire possible angular range of travel, gathers information from this actuator representing the number of motor steps counted during this movement, and compares this information with one or more pre-recorded data items which each correspond to a particular flap or type of flap. By particular flap or type of flap is understood here a flap or type of flap associated with one of several specific ventilation functions, or with a mixing function, or with a demisting function, or with a deicing function, etc.

Two particular applications of this identification method will now be described.

A first application relates to the checking of the fitting of the actuators during the assembly or the repair of the air-conditioning installation, each actuator being allocated a specific address known to the central control unit, either prior to its fitting, or during the fitting.

The address of an actuator is stored, for example, in a non-volatile memory of the drive circuit 100.

FIG. 3 shows the operations carried out with a view to this checking, by running a checking programme loaded into the central control unit 20 and running programmes loaded into the drive circuit 100.

A first stage 30, on starting of the checking programme, consists in causing the flap associated with the actuator to be checked to move towards one of the extremities of its travel, which is detected (test 31) by arrival on one of the end-of-travel stops.

The drive to the actuator is achieved by addressing it using the address known to the central drive unit 20 corresponding to the particular flap associated with the actuator.

Next, the flap is caused to move (stage 32), and the counting of the individual steps of the stepper motor by the drive circuit 100 is started. This counting is carried out, for example, on the basis of the pulses delivered by the analog interface 106 under the control of the circuit 100.

In response to the detection of arrival on the other end-of-travel stop (test 33), the motor is stopped and the number of steps counted is stored in memory by the drive circuit 100 (stage 34).

The number of steps counted is read by the central control unit 20 via the information bus 18, by addressing of the actuator (stage 35).

The number read is compared (test 36) by the central control unit with pre-recorded data which corresponds to the known angular range of travel of the flap or of the type of flap associated with the actuator in question. The pre-recorded data can be expressed in terms of the number of motor steps or in angle value. In this latter case, the number of steps counted is converted into an angle on the basis of the known angular value of an individual step of the stepper motor, the actuators 10 using identical motors.

Depending on the result of the comparison, the result of checking is displayed in the form of "correct fitting" (stage 37) or "error" (stage 38) on a display device, for example, temporarily linked to an output port of the central control unit 20. The result will be regarded as correct if the number of steps counted corresponds to the pre-recorded data with a predetermined margin of error, for example of 5% or of 10% in order to take account of inevitable inaccuracies and variations over time of the number of individuals steps of the stepper motor for a given angle value.

Figure 4:
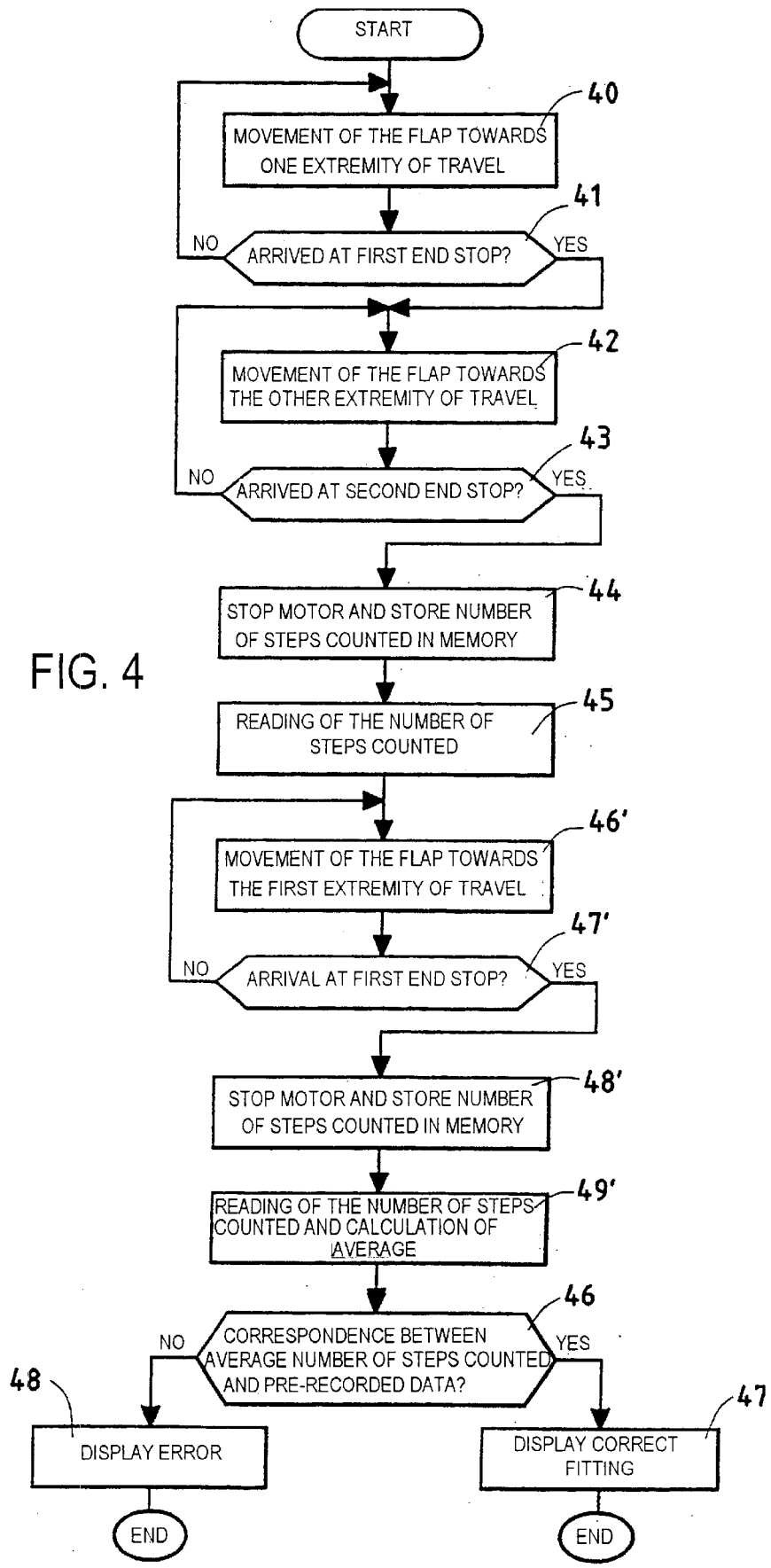
FIG. 4 shows a variant implementation of the method of FIG. 3.

FIG. 4 illustrates a variant of the checking method according to which several (in this instance two) movements of the flap over its entire angular range of travel are ordered.

Stages 40 to 45 are identical to stages 30 to 35 of the method of FIG. 3, namely arrival of the flap at a first end stop, causing the movement of the flap and counting of the motor steps, detection of the arrival of the flap at the second end stop, memory-storage of the number of steps counted and reading of this number.

Next, a further movement of the flap is ordered (stage 46') and the motor steps are counted (after resetting to zero).

In response to the detection of the arrival again on the first end-of-travel stop (stage 47'), the motor is stopped and the number of steps is stored in memory by the drive circuit 100 (stage 48').

The number of steps counted is read by the central control unit and an average number of steps is evaluated (stage 49') by arithmetic averaging with the preceding number of steps counted.

Next, the average number obtained is compared with the pre-recorded data (test 46) corresponding to the flap in question, then the result of the check is displayed (stages 47, 48), in the same way as in stages 36, 37 and 38 of the method of FIG. 3.

It will easily be understood that more than two complete angular ranges of travel can be ordered before calculating the average value of the motor steps corresponding to an angular range of travel of the flap.

Another application of the actuator-identification method according to the invention relates to the allocation of addresses to the actuators during assembly of the air-conditioning installation or during repair thereof.

The address allocation to an actuator associated with a particular flap then consists in recording, in a preferably non-volatile memory of the drive circuit 100, the address known by the central control unit 20 for this actuator.

In the central control unit 20 are contained the addresses of the various actuators and data representing the angular ranges of travel of the flaps associated with the actuators. Angular range-of-travel data is associated with each address.

The address-allocation process is carried out every time an actuator is fitted.

Figure 5:
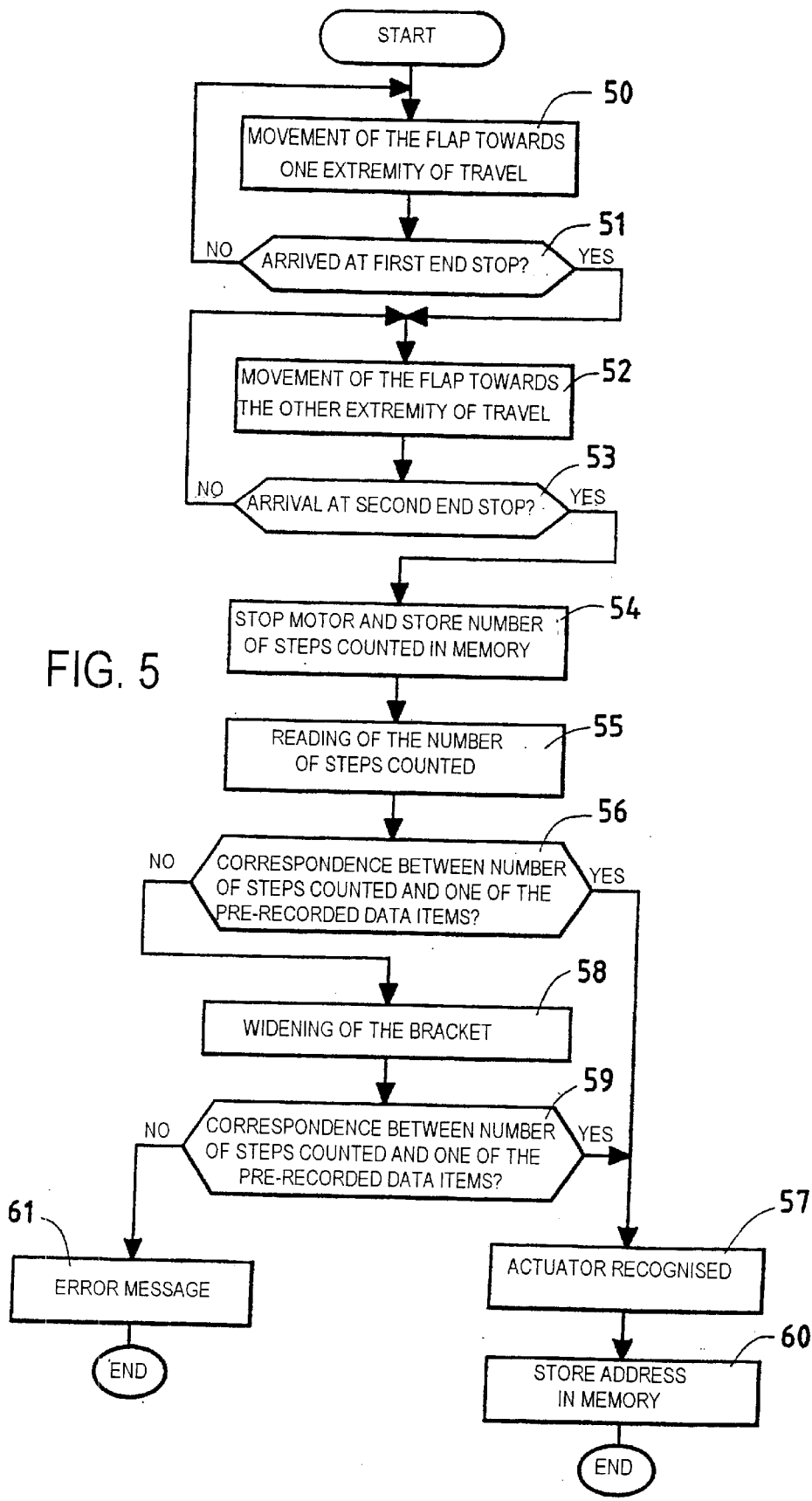
FIG. 5 is a flow chart showing the sequence of an identification method in accordance with the invention applied to the allocation of an address to a flap actuator.

FIG. 5 shows the operations carried out with a view to this address allocation by running an addressing programme loaded into the central control unit 20 and programmes loaded into the drive circuit 100.

The first stage 50, after starting of the addressing programme, consists in causing the flap associated with the actuator in question to move to one of the extremities of its travel, which is detected (stage 51) by the arrival on one of the end-of-travel stops.

The drive to the actuator is implemented by addressing it using the temporary address (generally formed by 0) which is given to it on manufacture.

Next, the movement of the flap is ordered (stage 52), as is the starting of the counting of the individual steps of the stepper motor by the drive circuit 100.

In response to the detection of arrival on the other end stop (test 53), the motor is stopped and the number of steps counted is stored in memory by the drive circuit (stage 54).

The number of steps counted is read by the central control unit 20 via the information bus 18, by addressing the actuator with its temporary address (stage 55).

The number read is compared (test 56) by the central unit with the pre-recorded data which correspond to the angular ranges of travel of the various flaps of the installation. As indicated above by reference to FIG. 3, the recorded data can be expressed in terms of numbers of motor steps or in terms of values of angles.

If a correspondence is established with one of the recorded data items (test 57), within a bracket of 5% to 10%, for example, centred on this data item, the actuator is deemed to be recognised (stage 58). Otherwise, the bracket above can be widened (stage 59). If, after this widening, the actuator is still not recognised (test 60), an error message is issued (stage 61) and the process has to be restarted, possibly after having changed the actuator.

When the actuator is deemed to be recognised, the associated address known to the central control unit 20 is forwarded to the actuator via the information bus 18 so as to be recorded in a preferably non-volatile memory of the drive circuit 100 (stage 60).

In step with the installation and of the allocation of addresses to the actuators, the list of recorded data compared with the number of motor steps counted can be progressively reduced by withdrawing from this list the data corresponding to the actuators already identified.

Moreover, as in the embodiment of FIG. 4, the number of steps counted can be an average value calculated over several complete angular ranges of travel of the flaps.

The address-allocation process could be used in the event of a repair of an air-conditioning installation, when a new actuator or several new actuators not provided with a final address is or are installed. In this case, it would be possible to cope with a situation in which similar or adjacent angular ranges of travel are associated with different addresses, that is to say when flaps having similar or adjacent angular ranges of travel are associated with different actuators, as long as the actuators to be replaced are associated with flaps having different angular ranges of travel. This is because only addresses not already allocated to actuators in place could be assigned.

What is claimed is:

1. Method of identifying a flap actuator with a stepper motor in a motor-vehicle air-conditioning installation, characterised in that it comprises the stages which consist in:

causing the flap to move over the whole of its angular range of travel, counting the number of motor steps during this movement, and comparing the number of steps counted with at least one item of pre-recorded information corresponding to a particular flap or type of flap.

2. Method according to claim 1, characterised in that the flap is caused to move between two end-of-travel stops.

3. Method according to claim 1, characterised in that the flap is caused to move several times over the whole of its angular range of travel, and an average is formed of the numbers of steps counted during the different movements.

4. Method according to claim 1, for checking the fitting of an actuator, characterised in that the flap associated with this actuator is caused to move and that conformity is verified between the number of steps counted and the pre-recorded information corresponding to this flap.

5. Method according to claim 1, for allocating an address to an actuator connected via an information bus to a central control unit, characterised in that the flap associated with this actuator is caused to move, this flap is identified by comparison between the number of steps counted and several pre-recorded information items corresponding to various flaps, and an address corresponding to the flap identified is stored in memory in a memory of a circuit associated with the actuator.

* * * * *